Nov. 4, 1952   C. M. HUNTINGTON   2,616,261
TURBINE-TYPE HYDRAULIC TORQUE CONVERTER
Filed Feb. 13, 1947   5 Sheets—Sheet 1

INVENTOR.
CHARLES M. HUNTINGTON.
BY
ATTORNEY.

Nov. 4, 1952 C. M. HUNTINGTON 2,616,261
TURBINE-TYPE HYDRAULIC TORQUE CONVERTER
Filed Feb. 13, 1947 5 Sheets-Sheet 2

INVENTOR.
CHARLES M. HUNTINGTON
BY
ATTORNEY.

Nov. 4, 1952 C. M. HUNTINGTON 2,616,261
TURBINE-TYPE HYDRAULIC TORQUE CONVERTER
Filed Feb. 13, 1947 5 Sheets-Sheet 3
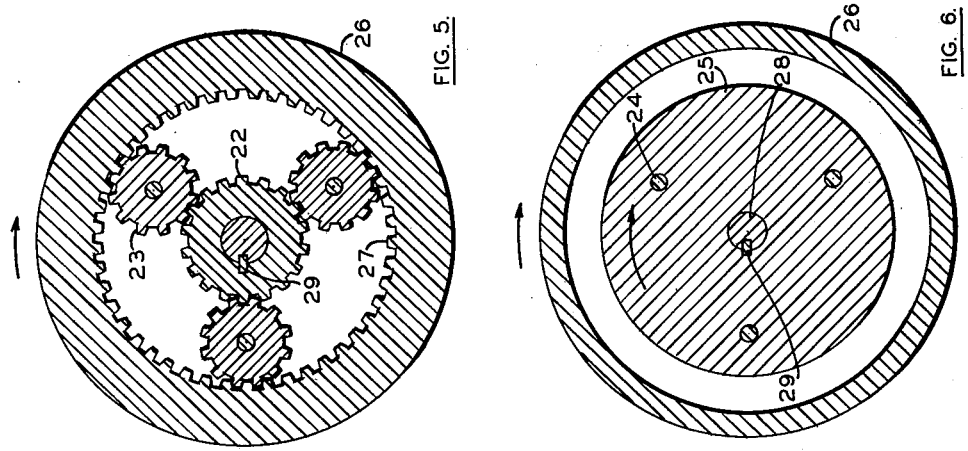
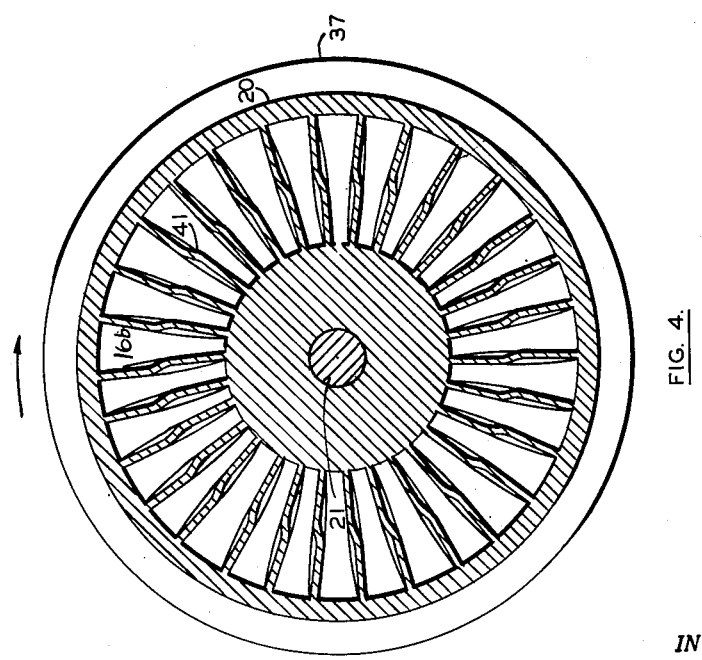
*INVENTOR.*
CHARLES M. HUNTINGTON.
BY
ATTORNEY.

Nov. 4, 1952 C. M. HUNTINGTON 2,616,261
TURBINE-TYPE HYDRAULIC TORQUE CONVERTER
Filed Feb. 13, 1947 5 Sheets-Sheet 4
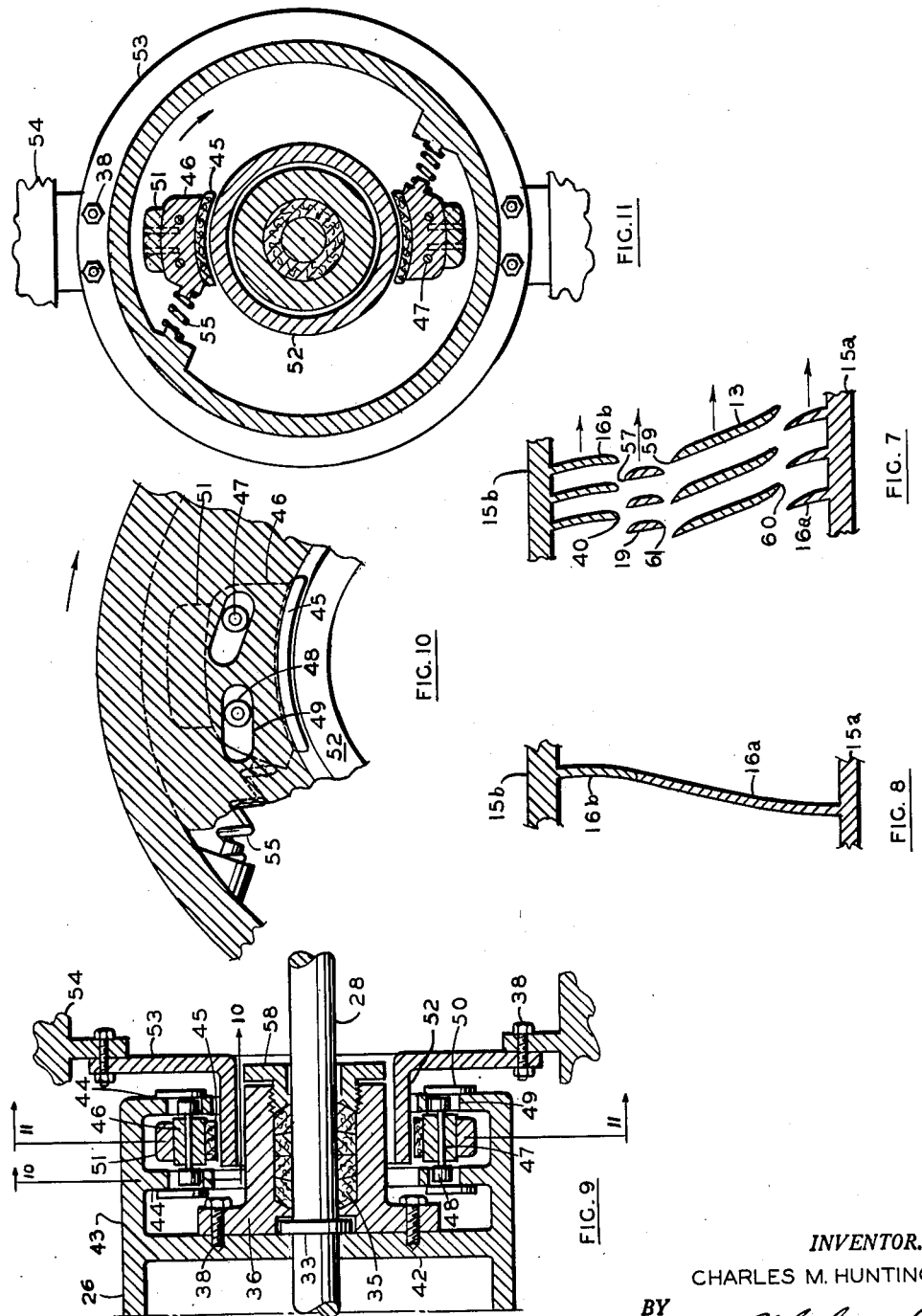
INVENTOR.
CHARLES M. HUNTINGTON.
BY
ATTORNEY.

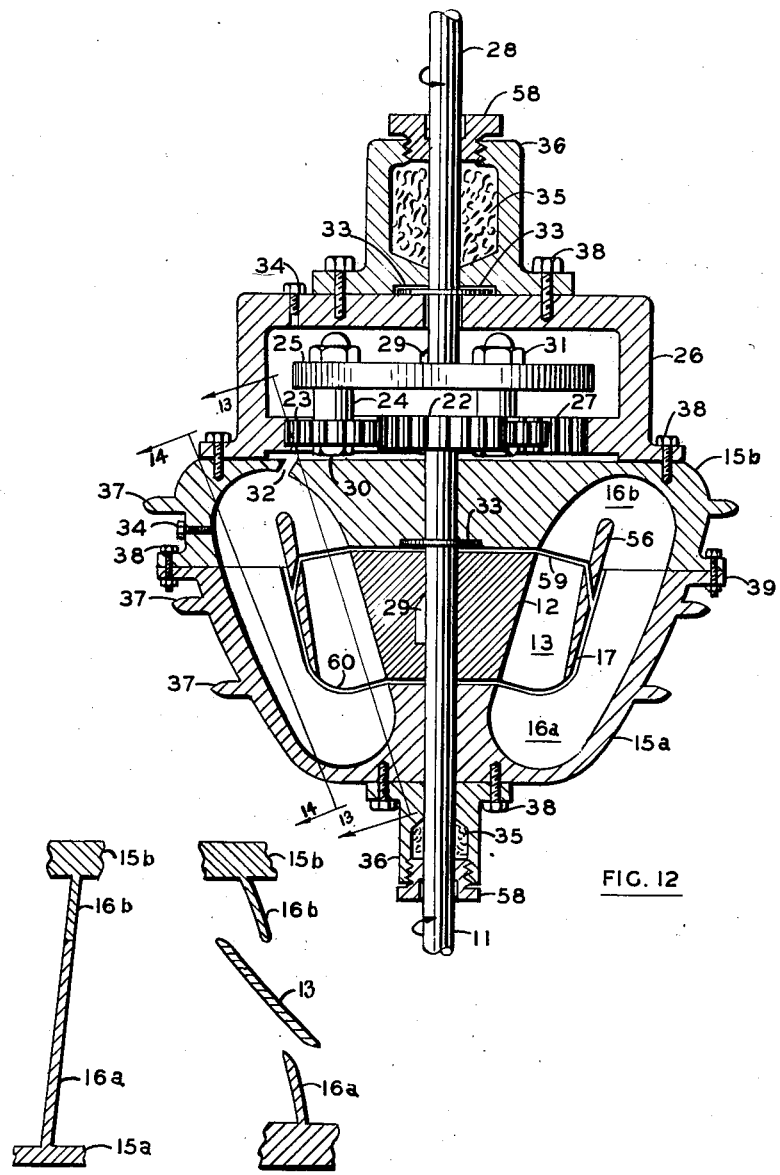

Patented Nov. 4, 1952

2,616,261

UNITED STATES PATENT OFFICE 2,616,261

TURBINE-TYPE HYDRAULIC TORQUE CONVERTER

Charles M. Huntington, United States Navy, Coronado, Calif.

Application February 13, 1947, Serial No. 728,211

4 Claims. (Cl. 60—54)

(Granted under the act of March 3, 1883, as amended April 30, 1928; 370 O. G. 757)

This invention relates to a co-acting mechanical and hydraulic mechanism for the transfer of power from a driving shaft through a series of impeller and turbine blades enclosed in a casing containing fluid and through an adjacent series of spur gears to a driven shaft and more particularly to improvements in the relationship and arrangement of impeller and of turbine blading and supporting rotors in a hydraulic unit and the coupling of separate driven turbine rotor units to a driven shaft through gears having different speed ratios.

Previously patented hydraulic units of this class have consisted principally of simple hydraulic couplings with a single impeller and turbine rotors with single or double sets of blading connected to a single driven shaft. Some of such units have had stationary guide blades positioned between sets of turbine blades and between turbine blades and intake side of impeller blades. All previously patented types of hydraulic torque couplings have inherent friction losses due to the skin friction on casing and fixed blades, which loss increases with the volume and speed of flow of the liquid, and such losses become increasingly objectionable at high shaft speeds. Torque generated by high impeller blade speeds, when exerting force on comparatively low speed turbine blading develops high torque in the driven shaft but generates high friction losses in the turbine blading which losses are wasted in the form of heat.

One object of this invention is to reduce heat losses in the hydraulic unit through improved arrangement of the turbine rotors and blading in such manner that all blades in the unit turn in the same direction at normal loads.

Another object is to provide improved starting torque by providing one set of turbine blading coupled to the driven shaft through gears with a high gear ratio and a second set of blading coupled to the driven shaft through gears with a low gear ratio.

This invention is designed for use in motor vehicles of all types, motor boats, and various types of industrial machines where variations in working loads require a flexible coupling capable of converting the speed and torque supplied by an engine or motor shaft to a different speed and torque in a driven shaft. This invention does not incorporate any disengaging clutch or reversing gear since it is intended that such mechanisms if required would be provided and mounted independently of the torque converter. A clutch could be installed on either the driving or driven shaft but reversing gear should be installed only on the driven shaft because this torque converter is designed for unidirectional rotation only. It will be readily seen that utilization of this unit with a conventional clutch, reversing gear, and disengaging gear is the only variable speed coupling that would be required in the transmission mechanism of a vehicle since this hydraulic coupling eliminates all need for other transmission gears with varying speed ratios and the necessity of constantly changing gears for different loads and accelerations. Since practically all hydraulic turbines allow some slippage at very low engine speeds with negligible loss in power, it is also possible to leave the unit directly coupled to the engine and driven shaft when driving motor is at idling speed and vehicle is stopped. Under such conditions any appreciable acceleration of the driving motor will, however, cause the hydraulic coupling to transmit appreciable power to the driven shaft and to start the vehicle moving. It will be seen therefore that this torque converter will greatly simplify current vehicle controls and driving operations and at the same time produce high accelerating torque without either the conventional hand or automatic shifting through different sets of gears with varying speed ratios.

Other advantages of this invention will be obvious from the following description and accompanying drawings in which Fig. 1 is a longitudinal section through the axis of the casing, rotary cones and gear unit.

Fig. 4 is a transverse section in a plane indicated by the line 4—4 in Fig. 1.

Fig. 5 is a transverse section in a plane indicated by the line 5—5 of Fig. 1.

Fig. 6 is a transverse section in a plane indicated by the line 6—6 of Fig. 1.

Fig. 7 is a partial transverse section through blading and casing in a plane indicated by the line 7—7 of Fig. 1, showing relationship of impeller blades, low speed rotor blades, and internal portion of casing blades and the cross sectional form of blades in such plane.

Fig. 8 is a partial transverse section through casing blades and casing in a plane indicated by line 8—8 of Fig. 1 showing sectional shape of casing blades in such plane.

Fig. 9 is an alternate longitudinal section above line 9—9 of Fig. 1 showing a brake mechanism as a means of limiting rotation of the casing to one direction only.

Fig. 10 is a partial transverse section in a plane indicated by the line 10—10 of Fig. 9. This figure is drawn to expanded scale.

Fig. 11 is a transverse section in a plane indicated by line 11—11 on Fig. 9.

Fig. 12 is a longitudinal section through axis of casing, rotary cone and gear unit showing alternate positive drive assembly.

Fig. 13 is a partial transverse section through blading and casing on line 13—13 of Fig. 12.

Fig. 14 is a partial transverse section through casing and blades on line 14—14, of Fig. 12.

Figure 1:
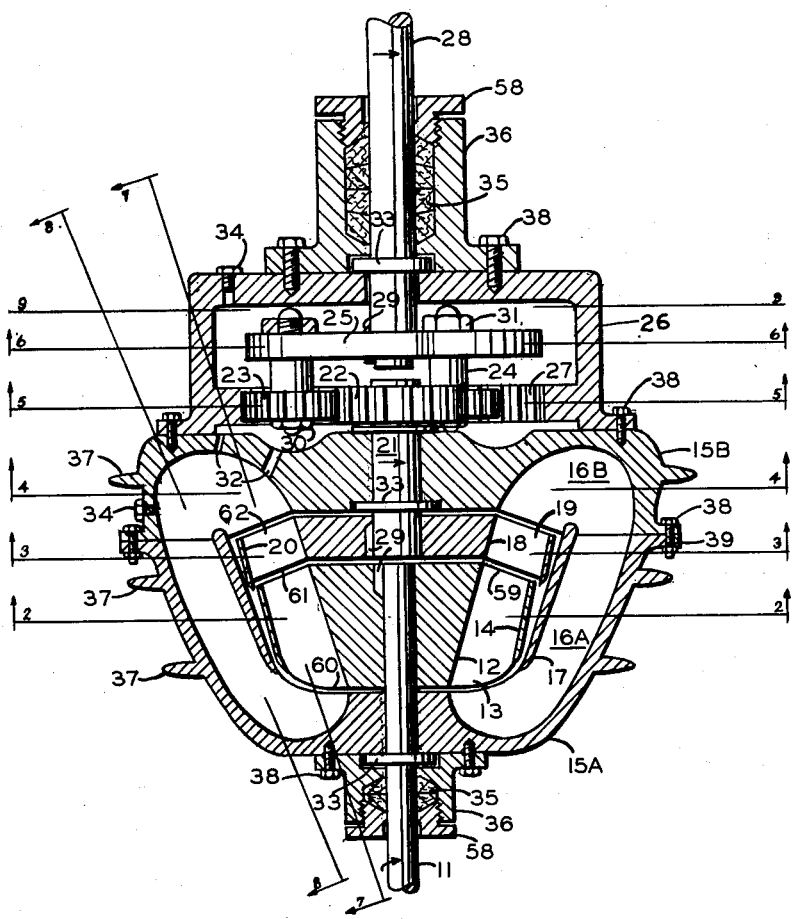

Referring to the drawings, the invention will be further described and explained by reference to the numbered parts.

Figure 3:
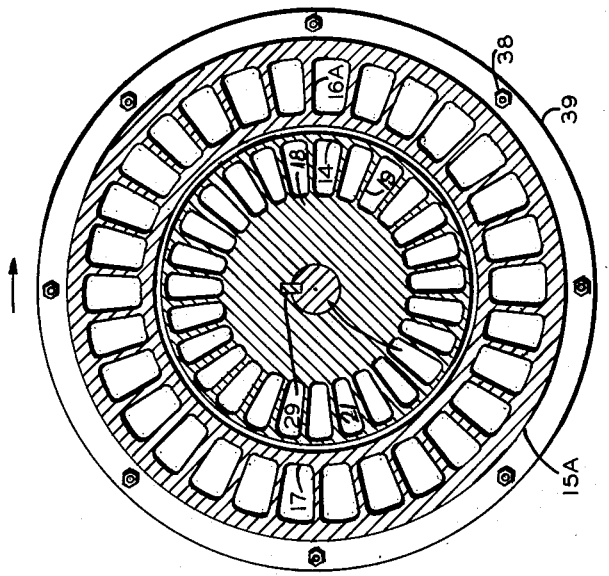
Fig. 3 is a transverse section in a plane indicated by the line 3—3 in Fig. 1.
Figure 2:
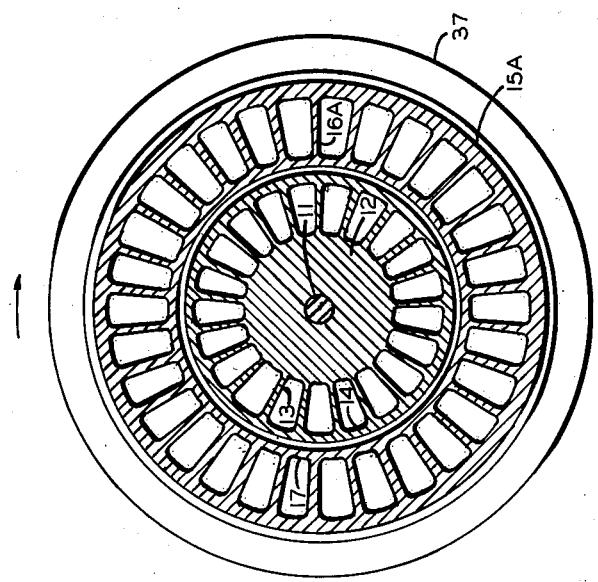
Fig. 2 is a transverse section in a plane indicated by the line 2—2 in Fig. 1.

Power is delivered to the hydraulic torque converter unit by driving shaft 11, which extends into the interior of the unit, and to the end of which is securely attached an impeller unit composed of cone 12, blades 13, and band 14. The blades 13 are substantially part of cone 12, and band 14 circumscribes blades 13 and may be cast with the cone and blades or subsequently securely attached to the tips of the blades. The outer casing of the unit is composed of two sections, 15A and 15B, said sections being securely bolted together at flange 39 by a plurality of bolts 38. The interior of the casing structures 15A and 15B contain a plurality of internally extending guiding blades which are substantially part of the casing and structures and which are designated 16A and 16B to correspond with the aforesaid sections of the casing. Each of blades 16A and 16B form substantially a continuous blade when the two sections of casing 15A and 15B are bolted together. The internal edges of blades 16A are attached to an internal separator cone 17 along a substantial portion of the axial length of blades 16A. Adjacent to the wider end of cone 12 is another cone 18 which may be considered as a low speed driving turbine. Cone 18 also contains a plurality of turbine blades 19 which blades are circumscribed by band 20 attached to the blades at their outer ends or integral therewith. Blade 16A and 16B when coupled together in alignment, may be considered as a plurality of C-shaped blades with blades 13 and 19 extending into the opening in the C to form a continuous fluid path of oval form with the major axis of the oval positioned at a substantial angle to the axis of the casing. The low speed turbine rotor 18 is securely attached to a short shaft 21 which is supported by casing 15B. One end of shaft 21 extends through the end of casing 15B into gear casing 26 and on this end of shaft 21 is securely mounted an external spur gear 22 which may be considered a sun gear. Spur gear 22 meshes with a plurality of planetary gears 23 positioned externally of gear 22. Planetary gears 23 are supported by studs 24 which in turn are mounted on planetary gear disc 25. All gears are enclosed by casing 26 which is cup shaped in form and which is securely bolted to casing 15B with an oil tight seal at their abutted surfaces. The interior periphery of casing 26 contains an internal ring gear 27 which is substantially part of the casing and which gear is external to and meshes with the planetary gears 23. Planetary gear disc 25 is attached to and drives output or driven shaft 28. Other parts not previously mentioned in Figures 1 to 8 inclusive are shaft keys 29 which are indicated only as a means of securing rotary parts to their respective shafts, planetary gear stud collars 30 which retain planetary gears on their respective studs and nuts 31 which secure planetary gear studs to disc 25. Vents 32 allow liquid to flow between casing 15 and gear casing 26. Thrust collars 33 are indicated as a means of maintaining shafts in longitudinal position. Filler plugs 34 are indicated as means for filling and draining the spaces enclosed within casings 15A, 15B and 26. Loss of liquid within the enclosed space is prevented by packing 35 which packing is held in place by gland casings 36 and gland nut 53. Heat generated in casings 15A and 15B is dissipated through cooling fins 37.

Description of the operation of this preferred embodiment of the invention as indicated in Figures 1 to 8 inclusive is as follows: In all drawings the arrows indicate the direction of normal rotation, that is the direction of rotation of shaft 11. Assuming that all parts of the mechanism are stopped and that all of the space inside casings 15A, 15B and 26 contains liquid except for a small portion of the space which contains enough air to allow for expansion of the oil due to heat. Power from an external source is applied to shaft 11 causing this shaft and attached impeller to rotate. Liquid inside casings 15A and 15B immediately starts to circulate by motion of blades 13. It will be noted that due to the shape and angular position of blades 13 with respect to the axis of shaft 11 that liquid leaving the trailing edges of these blades may be considered as having motion in all three standard reference planes or: motion parallel to the axis of the impeller, motion in a plane transverse to the axis of the rotor and away from the axis parallel to the radii emanating therefrom, and motion in the same transverse plane at right angles to the radii. This latter motion may also be considered as motion in a plane tangent to the cone formed by the trailing edges of the impeller blades. Although particles leaving a rotary impeller and free to travel through space will travel in a straight line, excluding gravity, the movement of the liquid in a plane transverse to the axis of the impeller and at right angles to the radii emanating from the axis may be considered as whirling or rotary motion when considered as taking place all of the way around the impeller rotor at the trailing edges of all blades. It will be noted in Figure 7 that blades 13 are relatively flat in the direction of movement in comparison to the pitch of propeller blades used on vessels, where it is desirable to obtain high thrust in the direction of the axis of the propeller. The comparatively flat angle of blades 13 in the direction of motion consequently imparts substantially high rotary velocity and force to the liquid expelled by movement of the blades. Band 14 prevents centrifugal force from driving the liquid in a radial direction except at the trailing edges 59 of the impeller blades and band 20 overlaps the end of band 14 and performs a similar action in the first stage or low speed turbine rotor. It will be noted in Fig. 7 that the leading edges 60 of blades 13 are slightly cupped or concave adjacent to the ends of the blades to cause the blades to scoop or bite into the liquid and to keep the space between impeller blades full of liquid. It will also be noted that the low speed rotor blades 19 are substantially flat on their face and that the back side of the blade is parallel to the face although the entering edges 61 and trailing edges 57 of the blades are sharpened to afford unrestricted movement of the liquid at these points. It will also be noted that the faces of these blades are tilted at a slight angle to a transverse plane normal to the axis of the rotors but such angle is limited to the normal relative rotary movement of blade 19 during normal flow of particles of liquid from its leading edges to its trailing edges. Blades 19 therefore absorb mainly the force due to rotary movement of the liquid leaving blades 13. Blades 19 are therefore substantially impulse blades and at normal speeds do not exert any substantial reactionary motion to the liquid impelled against the blades. Blades 19 do not absorb much of the centrifugal force generated by blades 13 because of their shape and position and the centrifugal force and the major portion of the force parallel to the axis of shaft 11 is transmitted past blades 19 to casing blades 16B. Blades 19 therefore commence to move in the same direction as blades 13 whenever the speed of blades 13 is appreciably higher than blades 19, and since blades 19 are not reaction blades rotor 18 and shaft 21 do not exceed the speed of shaft 11 as a result of forces from blades 13, but do attain substantially the same speed as shaft 11 when speed of shaft 11 is substantially constant. Forces applied through blades 19 are transmitted to sun gear 22, which gear is smaller and has a much higher driving ratio than gear 27 and therefore movement of gear 22 tends to rotate shaft 28 in the same direction as shaft 11. For normal usage sun gear 22 would have approximately a 5 to 1 speed ratio to driven shaft assuming outer ring gear 27 as stopped. Movement of gear 22 also tends to rotate gear 27 in the opposite direction to the rotation of shaft 11. Inertia in casings 15A, 15B and 26 in addition to pressure of liquid on blades 16A and 16B will, however, resist rotation of casing 26 and under average starting and operating loads the reverse motion of casing 26 will be of short duration.

When the moving liquid leaves blades 19 it impinges on blades 16B, at first on the inner portions of the blades and then the outer portions following in general the interior contour of the casing 15A and 15B. It will be noted that the leading edges of blades 16B are comparatively flat and are substantially impulse blades in cross section in the vicinity indicated in Fig. 7 by numeral 40. This form causes the blades 16B to absorb in this area the remainder of the rotary motion of the liquid not absorbed by blades 19. From the general area of blades indicated by numeral 40 blades 16B and abutted blades 16A are curved and tend to force the moving liquid in a path contrary to the direction of rotation of shaft 11. It will be noted in Fig. 4 that there is an offset in blades 19 in the area represented by numeral 41. This offset indicates the normal dividing line between liquid just leaving blades 19 and liquid following the interior boundaries or casing 15B and moving back towards the leading edges or blades 13. After the liquid passes the area represented by numeral 40 until it reaches the trailing edge of blades 16B the form of blades 16B and 16A is such that the liquid is constantly guided by these blades in a direction counter to the direction of rotation of shaft 11. The outer portion of blades 16A and 16B may therefore be considered as having a contracting continuous twist counter to the direction of rotation of cone 12 along the path of flow of liquid from the 15B end of the casing to the leading edges of the impeller blading. This form of blades 16A and 16B therefore causes the moving liquid to exert reactive forces against blades 16A and 16B along all of the return path of flow and causes casings 15A and 15B to rotate in the same direction as shaft 11. Since casings 15A, 15B and casing 26 are coupled together and casing 26 contains gear 27 which meshes with planetary gears 23, any force tending to rotate casings 15A and 15B is applied to these planetary gears. The combined forces of shaft 21 and casing 15A and 15B therefore tend to rotate shaft 28 in the same direction as shaft 11. Since blades 19 are subject to the first exertion of force from liquid leaving the rotor blades and since low speed shaft 21 has a much higher gear ratio tending to drive shaft 28, the speed of shaft 21 will remain substantially the same as the speed of shaft 11 at all but extremely heavy loads whereas the speed of casings 15A and 15B will vary inversely with the load on shaft 28 and may reverse direction at high loads. The effective relative forces applied to blades 19 and blades 16A and 16B may, however, be determined by calculation and trial so that casing blades 16A and 16B exert sufficient force to prevent stoppage of the casing or rotation counter to the direction of shaft 11 except under loads that would stall the driving motor or source of power. For heavy vehicles which are frequently underpowered blades 16A and 16B should be designed to rotate casings 15A and 15B at slightly below engine speed at normal loads and to continue to rotate in the same direction as the driving shaft but at greatly reduced speeds when very heavy loads are encountered.

There are applications for an apparatus of this character where very high torque is required for short periods, which torque would be sufficient to cause the casing to rotate in a reverse direction with substantial loss in efficiency. Under such conditions the low speed turbine unit may be designed with wider blades, the sun gear made proportionally smaller and the planetary gears proportionally larger and a non-reversing brake mechanism may be applied to the casing assembly to prevent rotation counter to the direction of rotation of the impeller unit. Figures 9, 10 and 11 indicate a brake mechanism as one means of preventing casings 15A, 15B and 26 from turning in a direction counter to the normal direction or rotation.

Referring now to Figs. 9, 10 and 11, numeral 42 is an alternate end plate of casing 26 and, a cylindrical shaped extension 43 of said casing supports the braking mechanism between two inwardly extending flanges 44. Brake bands 45 are attached to brake shoes 46 which are supported by pins 47. These pins are in turn supported by rollers 48 which rollers are operably positioned in slots 49 in flanges 44. Pins and rollers are kept in place by rings 50 attached to flanges 44. Heavy weights 51 are attached to brake shoes 46 to apply centrifugal force to the shoes. Brake drum 52 is stationary and is rigidly supported by disc 53 which in turn is securely attached to stationary structure 54. Spring 55 is calibrated to apply only sufficient force to keep brake band 45 against drum 52 when casing 26 is not rotating.

Operation of this unidirectional mechanism is as follows: Any force tending to rotate casing 26 in the direction indicated by the arrow in Fig. 10 causes brake shoes 46 to compress springs 55 thereby releasing pressure on brake band 45 due to the angular position of slots 49. Casing 26 is then free to rotate without resistance and any appreciable rotation causes weights 51 to draw brake shoes away from drum 52 due to centrifugal force. Rapid deceleration of casing 26 or complete stoppage causes springs 55 and weights 51 to force shoes 46 inwardly and any force tending to rotate casing 26 in a reverse direction causes brake shoes to force brake bands 45 heavily against drum 52 due to wedging action of pins 47 and rollers 48 in slots 49.

The illustration of the unidirectional mechanism indicated in Figures 9, 10 and 11 is one of the many optional means for preventing counter-rotation of casing 26 and disclosure herein does not in any manner restrict the scope of this patent to usage of this braking mechanism as herein disclosed.

There are applications for variable torque control where positive unidirectional movement of driven shaft is essential at all times such as in hoists where reverse movement of driven shaft might endanger human life but where rapid rotation of driven shaft under lighter loads is desirable. Figures 12, 13 and 14 disclose an alternate embodiment of some features of this invention wherein positive movement of driven shaft is assured at all times.

In this alternate disclosure similar parts have similar numerical designations as in previous figures. In this arrangement the low speed rotor represented by numerals 18, 19, 20 and 21 is eliminated and shaft 11 is extended through casing 15B into the gear section of the unit and sun gear 22 is mounted directly on driving shaft 11. When this arrangement is utilized in conjunction with a unidirectional braking mechanism such as that disclosed in Figures 9, 10 and 11, it is readily apparent that shaft 28 will rotate in the same direction as shaft 11 at a speed in direct relation to the gear ratio of gears 22 and 23 when ring gear 27 is stationary. The hydraulic energy exerted by blades 13 will be dissipated as heat under such conditions but such conditions should exist only for short periods when positive movement of shaft 28 in one direction only is essential. When the load on shaft 28 permits, the energy exerted by blades 13 on blades 16B will cause casings 15A, 15B and 26 to rotate in the same direction as shaft 11 and will increase the speed of shaft 28 to a speed governed by the amount of slippage between impeller and turbine blades, and liquid guide ring 56.

Having thus described my invention, it will be seen that I have provided a practical combination of hydraulic and spur gear mechanism that may be utilized to vary torque and speed between a driving and a driven shaft in a manner that will cause a smooth and automatic transfer of power from one shaft to another. It is to be understood that the details of construction and application of the apparatus shown herein are descriptive and do not limit the scope of this invention to the exact details of the disclosure. It is intended that the invention is to include everything disclosed and within the scope of the appended claims.

The invention described herein may be manufactured and used by or for the Government of the United States of America for governmental purposes without the payment of any royalties thereon or therefor.

What I claim is:

1. In a power transmission system having a driving shaft and a driven shaft, a fluid coupling comprising; an impeller operably mounted on said driving shaft and having a conically shaped central body and a plurality of blades protruding radially therefrom, said blades being positioned to impel liquid with substantial force in a direction having elements of motion parallel to the axis of said impeller, radially in a plane normal to said axis, and in a plane normal to said axis and to the radii emanating therefrom; a turbine rotor coaxially positioned adjacent to the large end of said impeller body, said rotor having a body whose periphery is a substantial continuation of the cone of said impeller body; a plurality of blades emanating radially from said rotor body, said rotor blades being substantially flat in cross section and position adjacent to the trailing edges of said impeller blades to absorb primarily the force generated by said impeller in a plane normal to said axis and at right angles to the radii emanating therefrom; a casing containing liquid enclosing and coaxially positioned with respect to said impeller and said rotor; and a plurality of inwardly extending guiding blades on said casing, said guiding blades being substantially C shaped and positioned externally of the blades of said impeller and said rotor, the blades of said rotor extending into the opening of the C to form a complete oval shaped path through the three sets of blades, said guiding blades extending inwardly substantially along raddii from the axis of said casing and having a substantially continuous twist about said casing axis, said twist being contrary to the direction of rotation of said impeller and existing from the leading edges of said casing blades adjacent to the trailing edges of said rotor blades to the trailing edges of said casing blades adjacent to the leading edges of said impeller blades, said rotor and casing being operably connected to said driven member.

2. A coupling according to claim 1 further characterized by the said impeller blades having a transverse section of compound curvature with a concave portion adjacent to the leading edge thereof, being concave or cupped in the direction of rotation, a substantially flat central portion, said central portion of said blade being at a substantial angle to a plane through the axis of the said rotor parallel to the said axis, and a convex portion adjacent to the trailing edge of the said blade, said convex portion being convex in the direction of rotation, said blade form imparting high rotary motion to liquid expelled by the said impeller and causing high rotational forces to be applied to the impulse blades of said turbine rotor.

3. A coupling according to claim 1 further characterized by said impeler blades and said turbine blades having bands around the tips of said blades, said bands being sustantially conical in shape with the said blades extending radially inwardly therefrom, said bands co-operating with said blades and said casing to cause the liquid to follow a path substantially oval in cross section, the major axis of the said oval being at a substantial angle to the axis of the said rotor and the said casing.

4. In a hydraulic power transmission system having a drive shaft and a driven shaft, a fluid coupling comprising an impeller connected to said drive shaft and having a conically shaped body and a plurality of blades extending radially therefrom, and a casing enclosing said impeller and positioned coaxially therewith, said casing having a plurality of inwardly extending blades, the blades of said casing surrounding the blades of said impeller to form a continuous fluid path of substantially oval shape, said casing being connected to said driven shaft and comprising a pair of sections connected together, each of said sections having a plurality of internally extending blades, each blade of one section and the corresponding blade of the other section forming a substantially continuous C-shaped blade, each of said C-shaped blades having a continuous twist counter to the direction of rotation of said body, said twist extending from the end of said section furthermost from said impeller to the leading edges of said impeller blades whereby the moving liquid exerts reactive force against said casing blades to cause said casing to rotate in the same direction as said driving shaft.

CHARLES M. HUNTINGTON.

REFERENCES CITED

The following references are of record in the file of this patent:

UNITED STATES PATENTS

| Number | Name | Date |
|---|---|---|
| 1,855,967 | Jandasek | Apr. 26, 1932 |
| 2,015,300 | Dell et al. | Sept. 24, 1935 |
| 2,088,818 | Skinner | Aug. 3, 1937 |
| 2,112,016 | Dell et al. | Mar. 22, 1938 |
| 2,143,312 | Griswold | Jan. 10, 1939 |
| 2,158,557 | Lammeren | May 16, 1939 |
| 2,162,803 | England | June 20, 1939 |
| 2,179,149 | Gruenberger | Nov. 7, 1939 |
| 2,204,779 | Swennes | June 18, 1940 |
| 2,255,430 | Lysholm et al. | Sept. 9, 1941 |
| 2,382,034 | Wemp | Aug. 14, 1945 |
| 2,407,289 | La Brie | Sept. 10, 1946 |